Aug. 14, 1934.  A. L. HADY  1,970,232
TESTING DEVICE
Filed Oct. 21, 1931
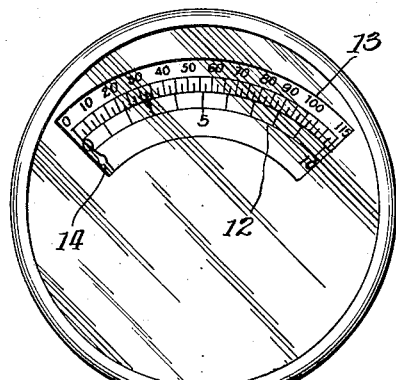
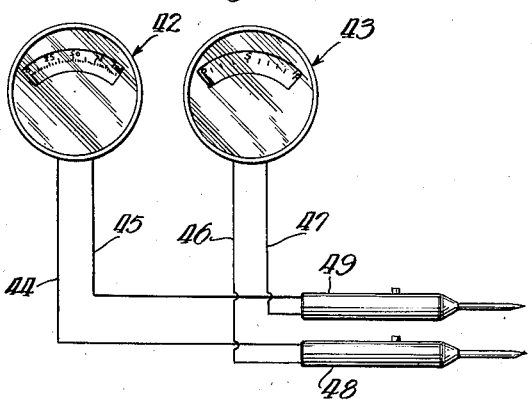
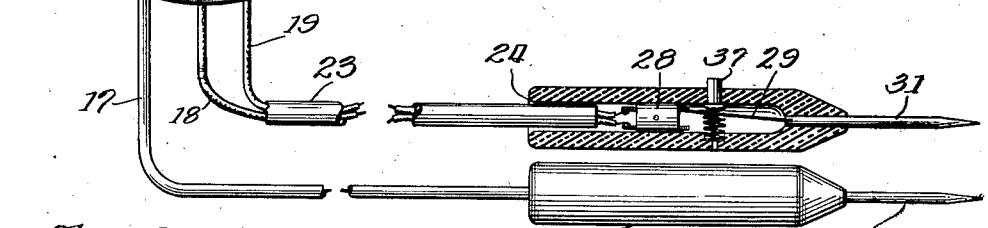
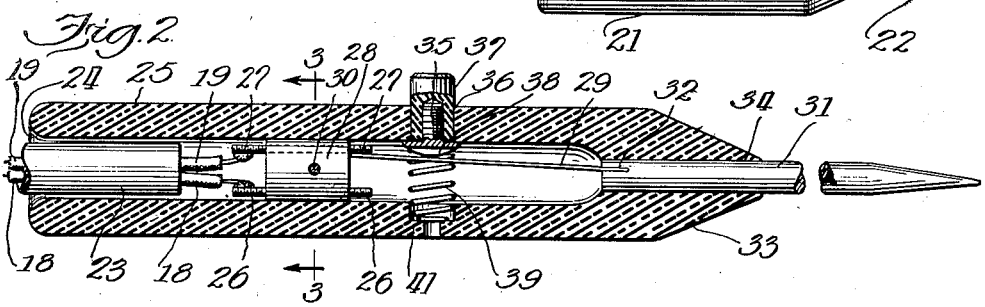
Inventor:
Arthur L. Hady
By Williams, Bradbury,
McCaleb & Hinkle.
Attys.

Patented Aug. 14, 1934

1,970,232

UNITED STATES PATENT OFFICE 1,970,232

TESTING DEVICE

Arthur L. Hady, Racine, Wis., assignor to Webster Electric Company, Racine, Wis., a corporation of Wisconsin Application October 21, 1931, Serial No. 570,105

4 Claims. (Cl. 200—51)

My invention relates to testing devices and more particularly to devices for testing electric circuits.

An object of my invention is the provision of an improved and convenient device for testing an electric circuit.

A further object of my invention is the provision of an improved testing device for an electrical circuit which when used with metering devices will provide a convenient means of switching the testing circuit from one scale to another on the meter or if used with two or more meters for switching from one meter to another.

My invention further contemplates the provision of an improved electrical circuit testing device which will act as a protective device for the meter with which it is used.

Other objects and advantages of my testing device will be apparent as it is better understood from the following description taken in connection with the accompanying drawing, in which:

Fig. 1 is a view partially in section showing my device in use with an electric meter;

Fig. 2 is an enlarged cross sectional view of a portion of Fig. 1;

Fig. 3 is a view taken on the line 3—3 of Fig. 2; and

Fig. 4 is a view showing my device in use with two meters.

In an electrical meter, for example a voltmeter, it is usual to provide two scales so that a wide range of voltages may be accurately read on the same meter. For accomplishing this the meter is provided with two resistances and three terminals or binding posts one a common terminal for both resistances. In connecting leads to the meter one lead is fastened to the common binding post and the other to either of the other two binding posts depending on the scale on which the voltage is to be read. To eliminate the necessity of changing binding posts a switching device is sometimes employed on the meter for changing the connection from one terminal to the other. In using this type of meter the testing of circuits with a wide range of voltages is still inconvenient as it is necessary for the operator to use short leads so that he may be near the meter or as is usual, one operator reads the meter and switches from one scale to the other as necessity demands while another operator makes the connections in the circuit.

To provide a more convenient circuit testing device, I provide means whereby the switching from one scale to the other may be accomplished by the operator making the connections in the circuit and if the meter is mounted in a convenient location one operator may read the scales, perform the switching operation, and make the circuit connections without returning to the meter every time a change from one scale to the other is necessary.

My device as illustrated in the drawing is shown being used with a meter 11. The meter 11 may be of any suitable type as used in testing circuits or measuring electrical quantities. For convenience I have illustrated my invention as being used with a conventional type of voltmeter. Ordinarily a voltmeter is supplied with two scales 12 and 13 and two resistances in order that a wide range of voltages may be read accurately. In some types of voltmeters the two scales are on separate dials and two indicators are employed one for each scale, but as illustrated in the drawing I have shown my invention in connection with a meter having a single indicator as the indicator 14.

A meter of this type employing two scales is usually equipped with three terminals (not shown), one terminal being a common terminal for both resistances. Ordinarily two leads are employed, one attached to the common terminal and the other passing to either of the other two terminals depending on the scale on which the voltage is to be read. The necessity of manually changing terminals is eliminated in some types of meters by employing a switching device for changing terminals. However, in my invention I employ three leads to the meter, one passing to the terminal common to both resistances as the lead 17 and the other two as the leads 18 and 19 passing to the other two terminals or binding posts. The lead 17 may be provided with a suitable covering of insulation and may terminate in a clip for positive insertion in a circuit to be tested or as shown in the drawing may be provided with a suitable handle as the handle 21 into which there may be securely fitted a test pin or pick 22 which may be of any suitable conducting material.

The other two leads 18 and 19 may also be provided with insulation and may be further protected by enclosing them in a covering of rubber or any other suitable material as the covering 23. The covering 23 together with the leads 18 and 19 may be inserted in a longitudinal aperture 24 formed in a housing or handle 25 of any convenient shape to facilitate handling and made of any material, although preferably made of hard rubber or other insulating material. The ends of the terminals 18 and 19 may be fastened as by soldering to conductors 26 and 27 respectively while the conductors 26 and 27 may be affixed in a member or terminal piece 28 made of an insulating material. The ends of the conductors 26 and 27 may project through the terminal piece and be adapted to form the fixed contacts of a switch when a contact member 29 is moved from one to the other. An aperture may be bored in the handle 25 and may be provided with threads for insertion of a screw 30 which may pass through the member 28 in order to fix the position of the member 28 in the handle 25.

The contact member 29 is preferably made of a resilient current conducting material and may be affixed in a slot 32 of a current conducting test pin 31 in any suitable manner as by soldering. The handle 25 is preferably pointed as at 33 and provided with a longitudinal aperture 34 into which the test pin 31 may be inserted and affixed.

At any convenient location in the handle 25 an aperture 36 may be bored for insertion of a button or switch member 37. The button 37 is preferably threaded on a member 35 provided with a rounded head as at 38 and the member 35 may be enlarged to retain the button 37 in the aperture 36. While the button 37 may be adapted to push the contact member 29 from engagement with the conductor or contact member 27 into engagement with the contact member 26 and may be adapted so that a positive push on the button 37 will be required to release the engagement of the contact member 29 with the contact 26 and re-engage the contact 27, still it is preferable that the contact member 29 be kept normally in engagement with one of the contacts as for example the contact 27. This is preferable as it is desirable that the contact with which the contact member 29 is normally in engagement be connected to the high resistance terminal of the meter so that no damage will result to the meter if accidentally the button 37 is in the wrong position when the test picks 22 and 31 are inserted in a high voltage circuit. For this purpose I employ a means for normally urging the contact member 29 into engagement with the contact 27 such as a spring 39. The contact member 29 passes between the coils of the spring 39 one end of which is seated in a recess 41 provided internally of the handle 25. The other end of the spring 39 seats on the rounded portion 38 of the member 35 and normally urges it upwards. It will be observed that in this manner the contact member and the button 37 are normally in the position shown in the drawing and the contact member 29 is in engagement with the contact 27.

My device, as has been mentioned, may be used in connection with any type of meter employed to read a wide range of electrical quantities and has a wide field of use in telephone, radio, or other electrical circuits. In use for example in a battery circuit to test voltage the leads 17, 18 and 19 are attached to the proper binding posts on the meter and if desired the leads 18 and 19 may be suitably marked so that the proper lead may be attached to the high resistance terminal. As shown in the drawing, the proper lead to be attached to the high resistance scale is the lead 19. After the leads have been properly secured to the binding posts the test pins are inserted in the circuit to be tested and the voltage read on the scale 13. If the voltage of the circuit is within the range of the lower scale it may be read more accurately on the scale 12 and accordingly the operator presses the button 37 and takes the reading on the lower scale 12. As soon as the operator has taken the required reading and released the button 37 the spring 39 returns the contact member 29 from engagement with the contact 26 back into engagement with the contact 27 so that danger of connecting the test pins in a high voltage circuit while the contact 29 is in engagement with the contact 26 is eliminated and the meter is protected from injury.

It will be apparent that I have provided a convenient testing device for determining electrical quantities which eliminates the necessity of changing binding post connections when changing from one scale to another. I have also provided a device which eliminates the necessity of returning to the meter in order to change from one scale to another for even if the meter is provided with a push button for changing terminals it is necessary to have two men to take the electrical readings in order to eliminate the necessity of the operator using the test pins from returning to the meter every time a change from one scale to the other is desired.

My device may be modified somewhat in order to adapt it for use with a meter having three or more scales by bringing the proper number of leads into the handle 25 and by minor changes in the switch so as to adapt the contact member 29 to be moved between three or more contacts. Further if it is desired to keep a meter in a circuit for some length of time in order to obtain a plurality of readings the test pin 31 may be eliminated and a clip for positive insertion of the meter in the circuit to be tested may be provided or if desired both a test pin and a clip may be secured in the handle 25 and connected to the contact member 29 in order that either of the devices may be inserted in the circuit. My device may also be employed with two or more meters as is shown in Fig. 4 where the meters 42 and 43 are connected by means of leads 44, 45, 46 and 47 to test pins 48 and 49 each similar to the device already described. It will be noted that the meter 42 which is the high resistance unit is connected by leads 44 and 45 to the test pins 48 and 49 and that leads 44 and 45 occupy the position corresponding to the lead 19 in Fig. 1. Similarly the leads 46 and 47 correspond to the lead 18 and connect the low resistance meter to the test pins. In this manner when the test pins are inserted in the circuit the voltage is normally across the terminals of the high resistance unit and it is necessary to press the buttons to change to the meter 43.

While I have described my invention as embodied in the specific form shown and described and have suggested only the specific alternatives, I contemplate that many changes may be made without departing from the scope or spirit of my invention.

I claim:

1. A testing probe comprising an insulating supporting body, a pointed probe carried by said insulating body, a resilient switch member carried by said probe and extending into said insulating body, and a pair of fixed contacts located in said body for connection to different leads, said resilient contact being normally in engagement with one of said fixed contacts, and a push button slidably mounted in said body and adapted to move said resilient contact from one fixed contact to the other.

2. A testing probe comprising an insulating supporting body, a pointed probe carried by said insulating body, a resilient switch member carried by said probe and extending into said insulating body, and a pair of fixed contacts located in said body for connection to different leads, said resilient contact being normally in engagement with one of said fixed contacts, and a push button slidably mounted in said body and adapted to move said resilient contact from one fixed contact to the other, said body having a spring socket, and a coil spring located in said socket and engaging said push button, said resilient contact passing through the coils of said spring.

3. In an electrical test pin, a test pin holder, a plurality of leads extending into said holder and secured therein, a test pin secured in said holder having a resilient contact secured thereto and means in said holder for moving said resilient contact into engagement with one of said leads or another.

4. In an electrical test pin, a test pin holder, a plurality of electrical leads extending into said holder and secured therein, a test pin secured in said holder having a resilient contact secured thereto, means for keeping said flexible contact normally in engagement with one of said leads and means for moving said resilient contact into engagement with the other of said leads.

ARTHUR L. HADY.